(12) United States Patent
Hollis et al.

(10) Patent No.: US 9,159,160 B1
(45) Date of Patent: Oct. 13, 2015

(54) TEXTURE SHARING BETWEEN APPLICATION MODULES

(71) Applicant: Lockheed Martin Corporation, Bethesda, MD (US)

(72) Inventors: Howell B. Hollis, Orlando, FL (US); Donald J. Boland, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 313 days.

(21) Appl. No.: 13/663,549

(22) Filed: Oct. 30, 2012

Related U.S. Application Data (60) Provisional application No. 61/553,206, filed on Oct. 30, 2011.

(51) Int. Cl.
  *G06F 13/14* (2006.01)
  *G06T 15/50* (2011.01)
(52) U.S. Cl.
  CPC ........................................ *G06T 15/50* (2013.01)
(58) Field of Classification Search
  USPC .......................................................... 345/520
  See application file for complete search history.

(56) References Cited

U.S. PATENT DOCUMENTS

| 7,962,919 | B2 | 6/2011 | Guschina et al. | |
| 7,976,392 | B2 | 7/2011 | Shimizu et al. | |
| 2004/0236562 | A1 | 11/2004 | Beckmann | |
| 2005/0165979 | A1 | 7/2005 | Kato | |
| 2007/0018980 | A1* | 1/2007 | Berteig et al. | 345/426 |
| 2007/0197291 | A1* | 8/2007 | Shimizu et al. | 463/36 |
| 2010/0020087 | A1* | 1/2010 | Elmieh et al. | 345/522 |
| 2011/0090232 | A1* | 4/2011 | Johnson | 345/506 |

* cited by examiner

*Primary Examiner* — Stephen R Koziol
*Assistant Examiner* — Khoa Vu
(74) *Attorney, Agent, or Firm* — Withrow & Terranova, PLLC (57) ABSTRACT

Texture sharing in a graphics memory is disclosed. A primary application establishes a virtual device for interaction with a graphics module. The virtual device includes a texture reference that refers to a render target texture in a graphics memory of the graphics module, and multiple render states, the render states having corresponding render state values. The plurality of render state values is saved in a memory in association with the corresponding render states. An external application module is invoked and provided a virtual device reference to the virtual device. Upon a return of the external application module, the plurality of render states are restored to the corresponding render state values. The graphics module is directed to generate a final scene in a final scene buffer in the memory in the graphics module using the render target texture.

15 Claims, 8 Drawing Sheets

TEXTURE SHARING BETWEEN APPLICATION MODULES

PRIORITY APPLICATION

This application claims priority to U.S. Provisional Patent Application Ser. No. 61/553,206, filed on Oct. 30, 2011, entitled "SYSTEM AND METHOD OF GENERATING AND INTEGRATING COMPUTER GRAPHICS INTO A SCENE RENDERED BY A CORE APPLICATION," which is hereby incorporated herein by reference in its entirety.

TECHNICAL FIELD

The embodiments relate generally to scene generation in a graphics module, and in particular to enabling multiple independent applications to share textures in a graphics module.

BACKGROUND

In order to provide a realistic simulation it is desirable to generate and present imagery at the highest possible resolution and greatest possible framerate. A simulator device typically includes at least one primary processor and a primary memory in which portions of the simulator application execute, as well as one or more graphics modules which may be coupled to the primary processor via a high-speed bus. A graphics module is a relatively special purpose device designed to render scenes for visualization, or display, to a user. An example of a graphics module is a Peripheral Component Interconnect Express (PCI-E) graphics card. Interface libraries, such as Microsoft® DirectX® and OpenGL® have been developed to interface with graphics modules to eliminate the need for an application developer to write a separate version of an application for each different graphics module.

Each of multiple applications that execute on a primary processor may interact with the graphics module to facilitate the generation of imagery associated with the respective application. The interface libraries, therefore, typically impose constraints on the sharing of the graphics module by multiple applications, in part to reduce a likelihood of causing a system fault, or other unintended consequence, which may be brought about by arbitrary and uncoordinated use of a graphics module by multiple applications.

Designing and manufacturing a robust simulation system is complex, and not practical for the vast majority of users of simulation systems. It is common, therefore, for a first entity to acquire a simulation system from a second entity that specializes in the design and manufacture of simulation systems. The first entity may wish to incorporate unique or custom imagery associated with the first entity into the stock imagery which accompanies the 3rd party simulation system. By way of non-limiting example, a shipping company that utilizes a particular truck manufacturer may desire to incorporate imagery associated with the dashboard of such trucks into a truck simulator purchased or licensed from a second company. The truck simulator may be shipped with stock imagery of a truck dashboard that is different from the trucks used by the first company. Such imagery may need to be continually updated during the simulation, such as imagery of a speedometer during the operation of a truck. However, it is common for simulation systems to be sold or licensed in a manner which does not lend itself to modification or integration of customized imagery.

Unfortunately, the constraints imposed by interface libraries can make it difficult, impractical, or impossible to dynamically incorporate imagery into an existing simulation system without modifying the actual simulation system. Accordingly, there is a need for mechanisms for facilitating the run-time integration of external imagery into a simulation system.

SUMMARY

The embodiments facilitate the integration of real-time external imagery into an existing simulation system. In part, this may be accomplished by sharing textures in a graphics module by multiple application modules running on a primary processor. In one embodiment, a primary application may establish a virtual device for interaction with a graphics module. The virtual device includes a texture reference that refers to a render target texture in a graphics memory of the graphics module, and a plurality of render states. The render states have corresponding render state values. The primary application saves the render state values in a memory in association with the corresponding render states. The primary application then invokes an external application module and provides the external application module with a virtual device reference to the virtual device. Upon a return of the external application module to the primary application, the primary application restores the plurality of render states to the corresponding render state values. The primary application then directs the graphics module to generate a final scene in a final scene buffer in the graphics memory in the graphics module using the render target texture. In this manner, the primary application may utilize imagery generated by the external application module, such as the render target texture, in a final scene that is controlled by the primary application.

In one embodiment, the primary application may execute on a primary processor and have access to a primary memory. The graphics module may include a graphics processor that controls the graphics memory.

In one embodiment, the primary application may set the plurality of render states to corresponding default render state values prior to invoking the external application module. Such default render state values may be published or otherwise made known such that a developer of the external application module may be aware of the render state values that are in place upon the invocation of the external application module.

In one embodiment, the primary application may determine that the external application module is to be invoked by the primary application. By way of non-limiting example, the primary application may access a configuration file at runtime and determine that the external application module is to be invoked to provide imagery for a final scene.

The virtual device reference may have a valid state and an invalid state. The primary application may, upon the return of the external application module, set the virtual device reference to the invalid state, so that the external application module is prohibited from further accessing the render target texture after returning from the invocation.

In one embodiment, the primary application may establish a plurality of virtual devices, wherein each virtual device corresponds to a different display device of a plurality of display devices. Each virtual device may include a corresponding texture reference that refers to a different render target texture of a plurality of render target textures in the graphics module. The primary application may invoke the external application module for each virtual device and provide the external application module with the virtual device reference to the respective virtual device. The primary application may then direct the graphics module to generate a plurality of final scenes in a plurality of final scene buffers in the memory of the graphics module using the plurality of render target textures.

Those skilled in the art will appreciate the scope of the embodiments and realize additional aspects thereof after reading the following detailed description of the preferred embodiments in association with the accompanying drawings.

BRIEF DESCRIPTION OF THE DRAWINGS

The accompanying drawings incorporated in and forming a part of this specification illustrate several aspects of the embodiments, and together with the description serve to explain the principles of the embodiments.

DETAILED DESCRIPTION

The embodiments set forth below represent the necessary information to enable those skilled in the art to practice the embodiments and illustrate the best mode of practicing the embodiments. Upon reading the following description in light of the accompanying drawings, those skilled in the art will understand the concepts of the embodiments and will recognize applications of these concepts not particularly addressed herein. It should be understood that these concepts and applications fall within the scope of the embodiments and the accompanying claims.

The embodiments facilitate the integration of real-time external imagery into an existing simulation system. In particular, the embodiments facilitate independent applications sharing a render target texture in a graphics memory, without a need to copy the render target texture from the graphics memory to the primary memory and back to the graphics memory. Copying imagery from the graphics module to the primary memory, and then back to the graphics module stalls the graphic pipeline and lowers framerates. Lower framerates may result in flickering and jagged performance, and may be disconcerting and/or undesirable to a user or participant of the simulation system. Thus, among other advantages, the embodiments facilitate the integration of dynamic, real-time imagery into an existing simulation system while maintaining relatively high framerates.

Figure 1:
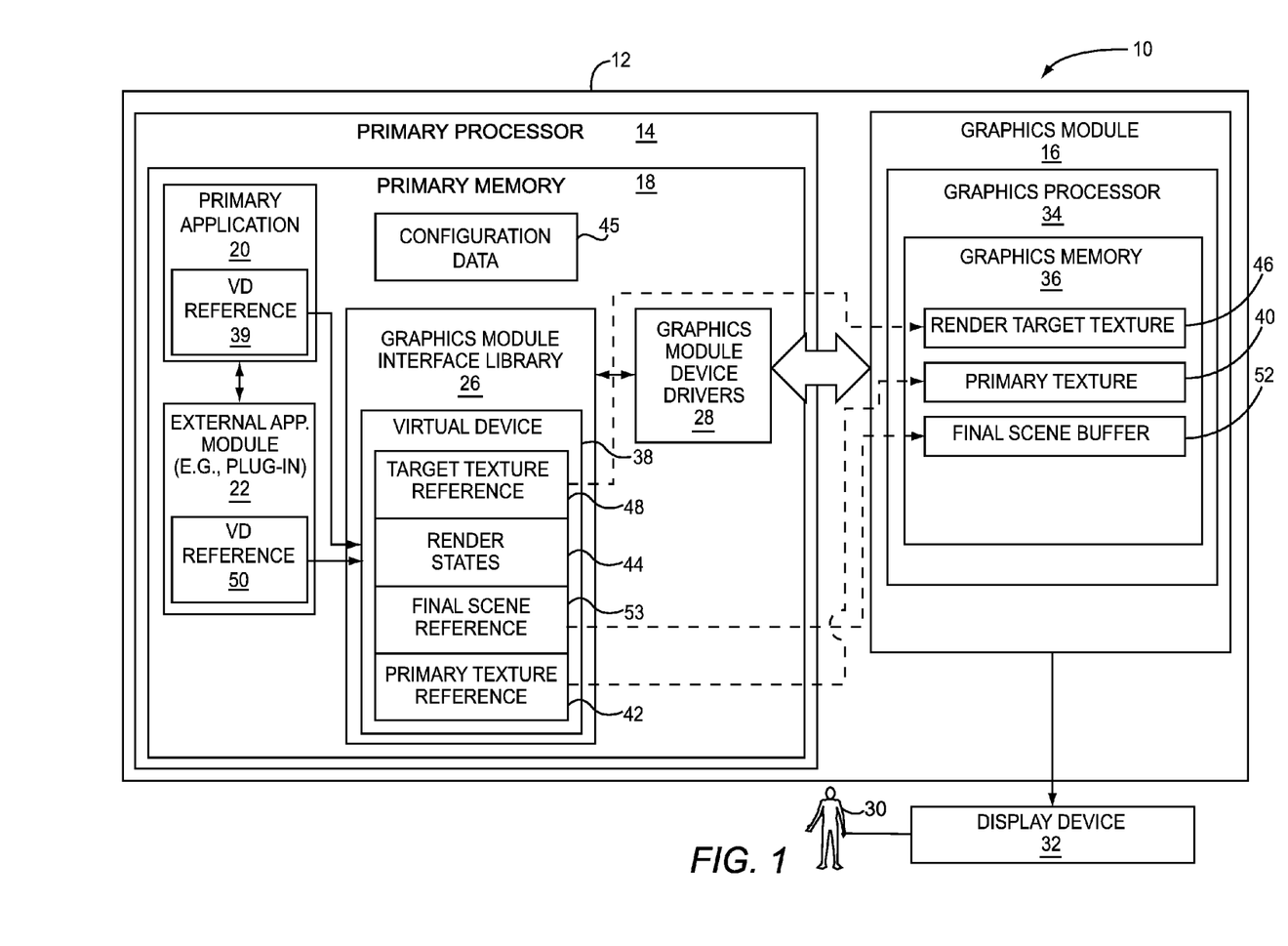
FIG. 1 is a block diagram of a simulation system according to one embodiment.

FIG. 1 is a block diagram of a simulation system 10 according to one embodiment. The simulation system 10 may include a simulation device 12 which includes a primary processor 14 and a graphics module 16. The use herein of ordinals, such as "first" or "primary" in conjunction with an element is solely for ease in distinguishing elements from one another, and does not imply a priority, a type, an importance, or other attribute, unless otherwise stated herein.

The primary processor 14 may be coupled to a primary memory 18 in which information may be stored. The information may include a primary application 20, an external application module 22, a graphics module interface library 26, and graphics module device drivers 28. The primary application 20, in one embodiment, may comprise a simulator module that provides a user 30 with a visualization of a virtual environment on a display device 32 during a simulation. In one embodiment, the primary application 20 may comprise the Lockheed Martin® Prepar3D® simulation package, although the embodiments are not limited to any particular simulation module, and have applicability to any simulation package, or any other module or application in which it would be desirable to share textures in a graphics module.

The graphics module 16 operates in response to signals or commands that the graphics module 16 receives from the graphics module device drivers 28. The graphics module device drivers 28 are typically developed and manufactured by the manufacturer of the graphics module 16, and may be developed and manufactured to issue commands that control the graphics module 16 in response to calls from the graphics module interface library 26. The graphics module interface library 26 provides a uniform interface for an application, such as the primary application 20, and for the developers of device drivers, such as the graphics module device drivers 28. In particular, the graphics module interface library 26 allows a developer of the primary application 20 to develop an application based on a known and public interface layer so that each application need not be specially designed for a particular manufacturer's device drivers. The graphics module interface library 26 may comprise any suitable interface library that provides an interface between an application and the device drivers associated with a graphics module. Non-limiting examples of suitable graphics module interface libraries 26 include the Microsoft® DirectX® interface library and the OpenGL® interface library. The graphics module 16 may include a graphics processor 34 which may be coupled to a graphics memory 36. Non-limiting examples of the graphics module 16 include an Accelerated Graphics Part (AGP) or Peripheral Component Interconnect Express (PCI-E) graphics card that includes a GeForce® or Radeon® chipset. For purposes of illustration, the embodiments are discussed in the context of a single graphics module 16, but are not limited to a simulation device having a single graphics module 16, and have applicability to simulation devices having multiple graphics modules 16.

The primary application 20 communicates with the graphics module 16 indirectly via the graphics module interface library 26. In particular, the primary application 20 invokes a particular function of the graphics module device drivers 28, and the particular function in turn invokes one or more of the graphics module device drivers 28 to perform a desired operation on the graphics module 16. The word "invoke" as used herein refers to the mechanism, whatever it may be, that causes control to pass from one module, such as the primary application 20, to another module, such as the graphics module device drivers 28. Non-limiting examples of an invocation may be a function call, a method call, a library call, or the like. The word "return" will be used herein to refer to the transfer of control back from an invoked module to an invoking module.

The mechanism for interaction with the graphics module 16 may include the use of a virtual device 38. The virtual device 38 may comprise a data structure used to, among other features, ensure that access to the graphics module 16 is coordinated among multiple applications. The virtual device 38 may also be used to maintain rendering information for the primary application 20, as will be discussed in greater detail herein. While only a single virtual device 38 is illustrated, the graphics module 16 may maintain a different virtual device 38 for each of a number of primary applications executing in the primary memory 18.

Figure 2:
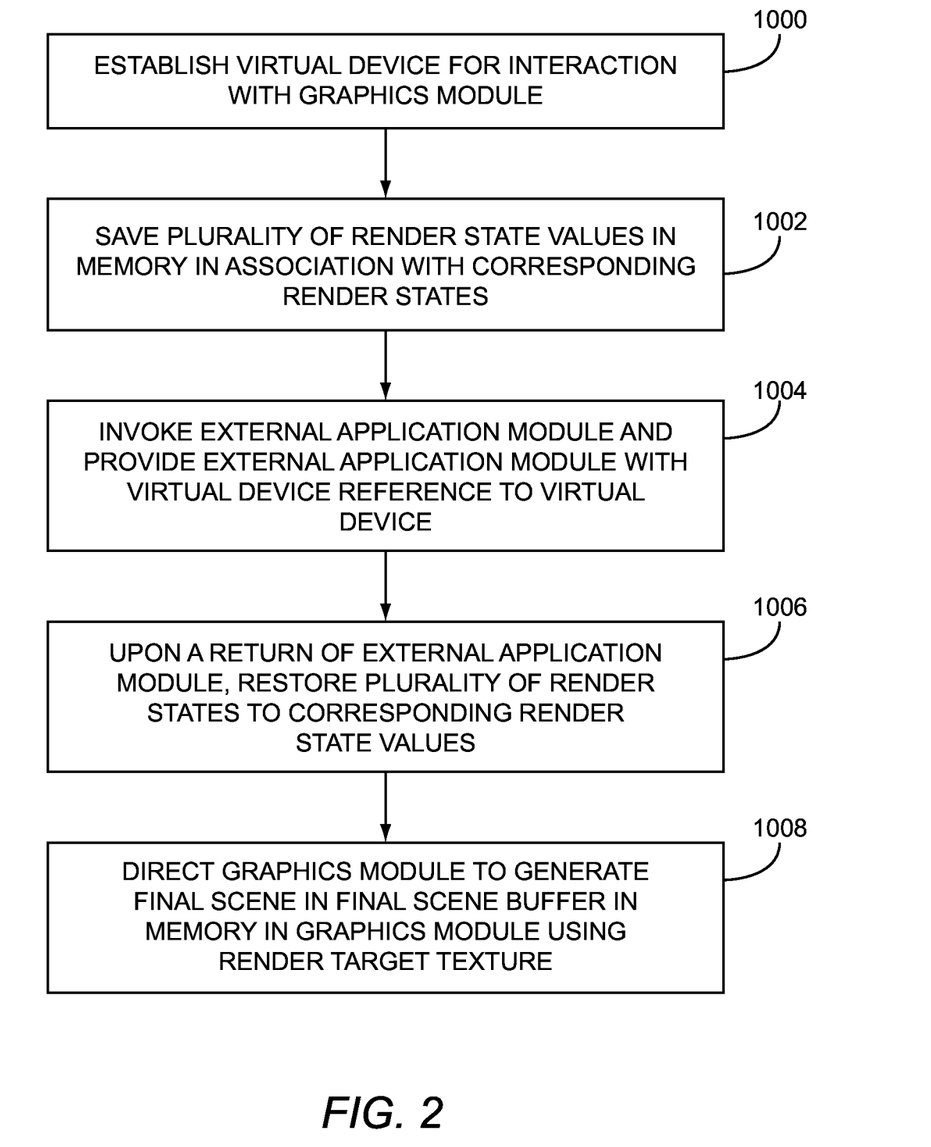
FIG. 2 is a flowchart of a process for sharing textures according to one embodiment.

FIG. 2 is a flowchart of a process for sharing textures according to one embodiment. FIG. 2 will be discussed in conjunction with FIG. 1. Assume for purposes of illustration and discussion with regard to FIGS. 1 and 2, that in the course of a simulation the primary application 20 generates imagery of a cockpit of an airplane, and that the entity associated with the external application module 22 desires to integrate into such imagery a particular gauge so that the user 30 perceives a gauge that would be substantially similar to the gauge in the airplane the user 30 may fly at some point in the future. Recall, as discussed above, that imagery, referred to herein as a final scene, may be generated and depicted to the user 30 multiple times each second, such as, by way of non-limiting example, 60 times per second. This is sometimes referred to herein as a framerate. Because the information conveyed by the gauge may vary over time, for purposes of realism it may be desirable that the gauge changes in real-time, and thus may be re-drawn multiple times each second. Initially, the primary application 20 may establish the virtual device 38 for use in interfacing with the graphics module 16 (FIG. 2, block 1000). Specifically, the primary application 20 may invoke a particular method, or function, of the graphics module interface library 26 which, when called, generates the virtual device 38. The primary application 20 maintains a virtual device (VD) reference 39 which points, links, or otherwise refers to the virtual device 38. This may occur, by way of non-limiting example, when the primary application 20 initializes. After the virtual device 38 is established, the primary application 20 may establish a primary texture 40 in the graphics memory 36 which may, again, involve one or more invocations or calls to functions of the graphics module interface library 26. The primary texture 40 may be referenced by a primary texture reference 42 that is maintained in the virtual device 38. The primary texture 40 may include a unit of memory, such as a memory buffer, in which the primary application 20 may cause or direct the graphics module 16 to generate imagery via the graphics module interface library 26. As discussed above, by way of non-limiting example, assume that the primary application 20 directs the graphics module 16 to generate imagery associated with the cockpit of an airplane in the primary texture 40.

The graphics module 16 may perform graphics operations in accordance with one or more render states 44. A render state 44 is an attribute that may affect the operation of the graphics module 16, and each render state 44 may have at any instant in time a particular value of a plurality of potential values that may affect the operation of the graphics module 16. Non-limiting examples of graphic operations that may be impacted by a render state 44 include alpha blending, ambient lighting, depth buffering, culling, lighting, shading, texture wrapping, and the like.

Once the cockpit imagery is generated in the primary texture 40, the primary application 20 may determine that the external application module 22 is to be invoked in order to facilitate the generation of the gauge imagery. In one embodiment, the primary application 20 may make this determination by accessing configuration data 45 which identifies that the external application module 22 is to be invoked. The configuration data 45 may include, by way of non-limiting example, a name of an executable file in which the external application module 22 is stored. Prior to invoking the external application module 22, the primary application 20 may first save the render state values of the render states 44 in association with the render states 44 in the primary memory 18 (FIG. 2, block 1002). Saving the render state values in association with the render states 44 means that the render state values are saved in a manner that associates each render state value with the corresponding render state 44.

In one embodiment, the primary application 20, prior to invoking the external application module 22, may also set the plurality of render states 44 to default render state values. Such default render state values may be published, or otherwise made available, to the entity that designs and manufactures the external application module 22 so that the external application module 22 can be designed with an understanding of the render state values at the time the external application module 22 is invoked.

The primary application 20 may also generate a render target texture 46 in the graphics memory 36 for use by the external application module 22. A target texture reference 48 in the virtual device 38 refers to the render target texture 46. The primary application 20 may make a second VD reference 50, which is a copy of the VD reference 39. The VD reference 50 may have two states, a valid state and an invalid state, wherein in the valid state use of the VD reference 50 is permitted, and in the invalid state use of the second VD reference 50 is not permitted. The primary application 20 may then invoke the external application module 22 and provide to the external application module 22 the VD reference 50 (FIG. 2, block 1004).

The VD reference 50 enables the external application module 22 to use the virtual device 38 to cause or direct the graphics module 16 to generate imagery, such as a gauge, in the render target texture 46. During such operation, the external application module 22 may alter one or more of the render states 44 as desired to cause the desired imagery to be generated in the render target texture 46. After the external application module 22 completes the desired processing to cause the generation of the gauge imagery in the render target texture 46, the external application module 22 returns to the primary application 20.

The primary application 20 may then invalidate the VD reference 50 to ensure that the external application module 22 does not use the virtual device 38 while the primary application 20 is using the virtual device 38. The primary application 20 may also restore the plurality of render states 44 to the render state values that were previously stored in association with the render states 44 prior to invoking the external application module 22 to ensure any manipulation of such render states 44 by the external application module 22 does not cause unintended consequences of subsequent operations by the primary application 20 (FIG. 2, block 1006). The primary application 20 may then direct the graphics module 16 to generate a final scene in a final scene buffer 52 using the render target texture 46, and the primary texture 40 (FIG. 2, block 1008). The virtual device 38 may include a final scene reference 53 that points to the final scene buffer 52. In response to such directions, the graphics module 16 may generate the final scene in the final scene buffer 52 based on the render target texture 46 and the primary texture 40, and display the final scene to the user 30 via the display device 32. The process discussed above with respect to blocks 1000 and 1002-1008 may occur repeatedly over a period of time during the simulation. While for purposes of illustration the process has been described as occurring in a particular sequence, or order, the embodiments are not limited to any particular sequence or order. By way of non-limiting example, the external application module 22 may be invoked prior to the generation of the primary texture 40 by the primary application 20.

In the preceding manner, the embodiments may facilitate the integration of imagery generated by the external application module 22 with that provided by the primary application 20 into a final scene in a manner that eliminates a need, by the external application module 22, to copy the imagery in the render target texture 46 from the graphics memory 36 to the primary memory 18, where it can be provided to the primary application 20 for integration into the final scene. This process in turn eliminates or reduces stalls in the graphics pipeline, facilitating high framerate integration of imagery from both the primary application 20 and the external application module 22. Inadvertent issues with render states 44 may be eliminated by storing and restoring the render states 44 when the virtual device 38 is used by the external application module 22, and by invalidating the VD reference 50 upon the return of the external application module 22 to the primary application 20. Notably, while the external application module 22 may be invoked by the primary application 20 at the same framerate at which the final scene is being generated, in some embodiments the external application module 22 may be invoked at a different framerate than that at which the final scene is being generated. By way of non-limiting example, the external application module 22 may be invoked twenty times per second, while the final scene is generated and presented to the user 30 at a framerate of sixty times per second. The primary application 20 may also determine that the external application module 22 need not be invoked at a particular time based on the view associated with the final scene being generated. By way of non-limiting example, if the gauge generated by the external application module 22 is not within the final scene, the primary application 20 may choose not to invoke the external application module 22.

As discussed above, for purposes of illustration the embodiments are discussed in the context of a single graphics module 16, but are not limited to a simulation device having a single graphics module 16, and have applicability to simulation devices having multiple graphics modules 16. In an embodiment wherein the simulation device 12 comprises multiple graphics modules 16, the primary application 20 may establish a different virtual device 38 for each graphics module 16, and may also invoke a different external application module 22 for each different virtual device 38.

While for purposes of illustration and ease of understanding only two textures are discussed herein, it will be understood that in practice any number of textures may be used to generate a final scene, and that the graphics memory 36 could contain tens or hundreds of different textures, any or all of which may ultimately be used to render a final scene.

While for purposes of illustration and ease of understanding the generation of only a single final scene is discussed, in some embodiments a graphics module 16 may generate multiple final scenes concurrently, such as in the case of a split-screen multiplayer mode, or a picture-in-picture mode. In such embodiments, the render target texture 46 may be used in the generation of multiple final scenes.

Figure 3:
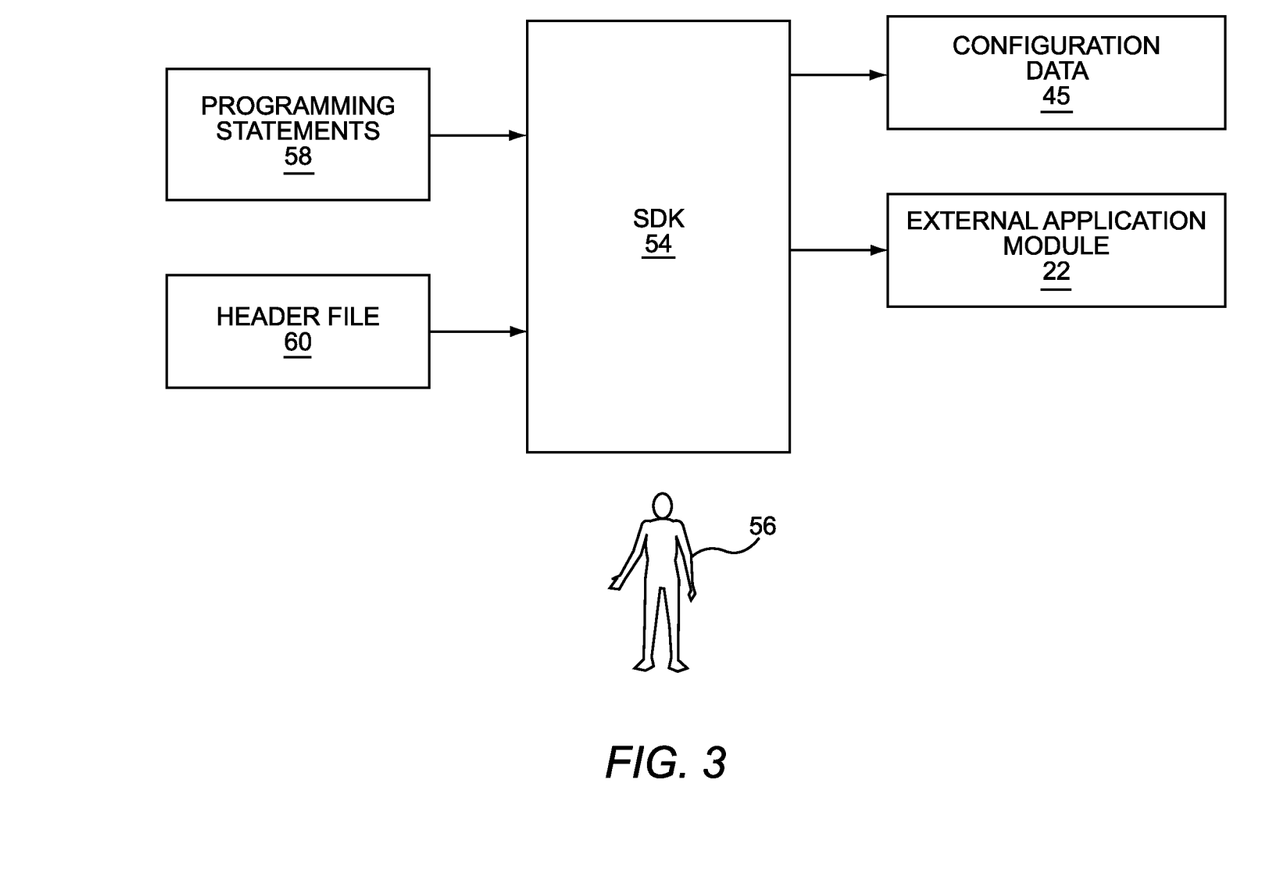
FIG. 3 is a block diagram of a development environment for generating the external application module according to one embodiment.

FIG. 3 is a block diagram of a development environment for generating the external application module 22 according to one embodiment. The entity that manufactures the primary application 20 (FIG. 1) may provide a software development kit (SDK) 54 that facilitates the design and manufacture of the external application module 22. The SDK 54 may receive, from a developer 56, one or more programming statements 58 that define the operation of the external application module 22. The SDK may also access a header file 60 that defines a mechanism by which the external application module 22 may interact with the primary application 20 during execution of the external application module 22. Based on this information, the SDK 54 may generate the external application module 22, and the configuration data 45. The configuration data 45 may include information from which the primary application 20 may determine that the external application module 22 is to be invoked during the generation of a final scene. While only a single external application module 22 is discussed herein for purposes of brevity, the SDK 54 may permit the generation of any number of external application modules 22, so that the primary application 20 may invoke a plurality of external application modules 22 when generating a final scene.

Figure 4:
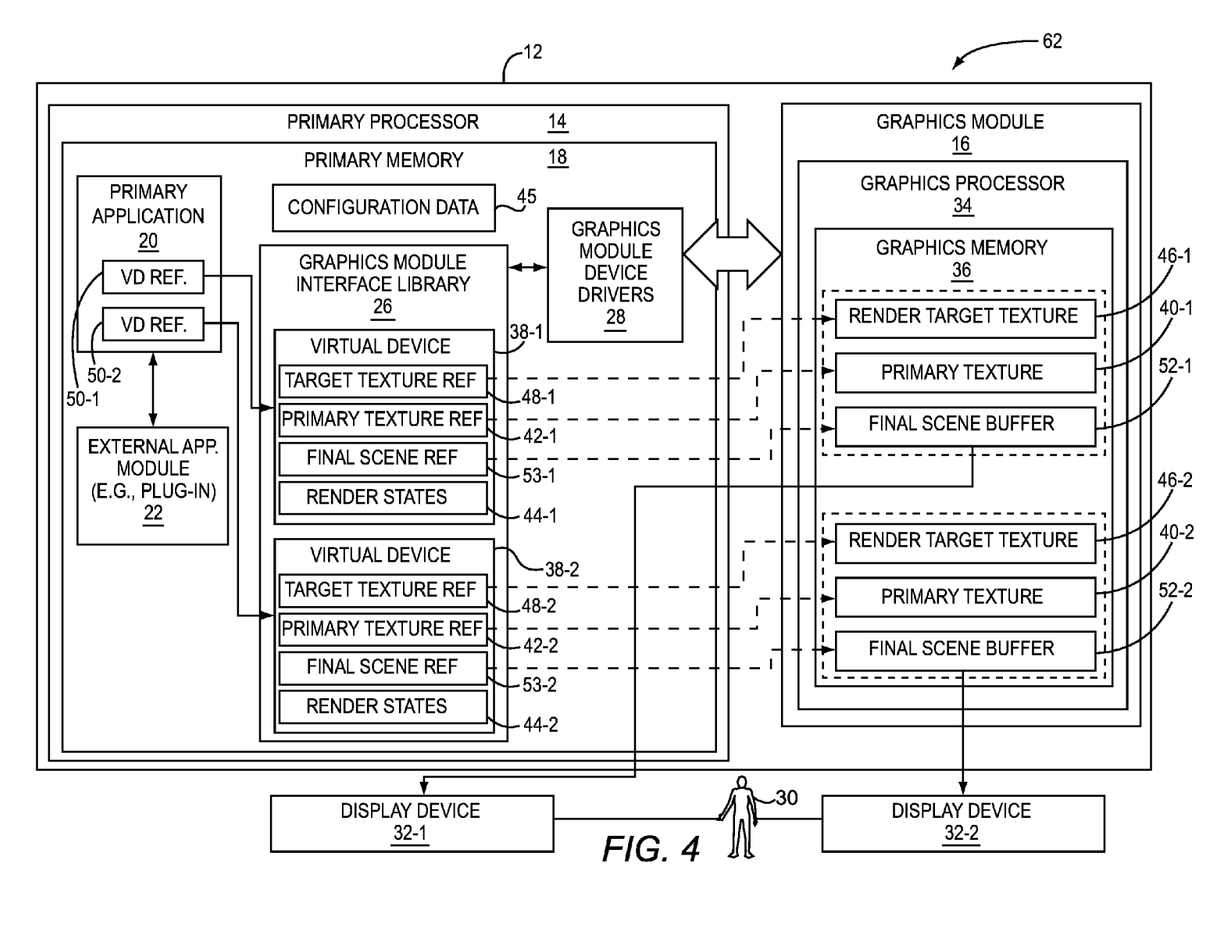
FIG. 4 is a block diagram of a simulation system according to another embodiment.

FIG. 4 is a block diagram of a simulation system 62 according to another embodiment. In this embodiment, the user 30 perceives the simulation via a plurality of display devices 32-1-32-2 (generally, display devices 32). The primary application 20 may establish a virtual device 38-1 that is associated with the display device 32-1, and a virtual device 38-2 that is associated with the display device 32-2. Accordingly, the primary application 20 may use the final scene buffer 52-1 to generate a final scene for the display device 32-1 and a final scene buffer 52-2 to generate a final scene for the display device 32-2. Moreover, the primary application 20 may establish a target texture reference 48-1 that refers to a render target texture 46-1 for use by the external application module 22 in order to integrate imagery provided by the external application module 22 into the final scene displayed on the display device 32-1. Similarly, the primary application 20 may establish a target texture reference 48-2 that refers to a render target texture 46-2 for use by the external application module 22 in order to integrate imagery provided by the external application module 22 into the final scene displayed on the display device 32-2.

Figure 5:
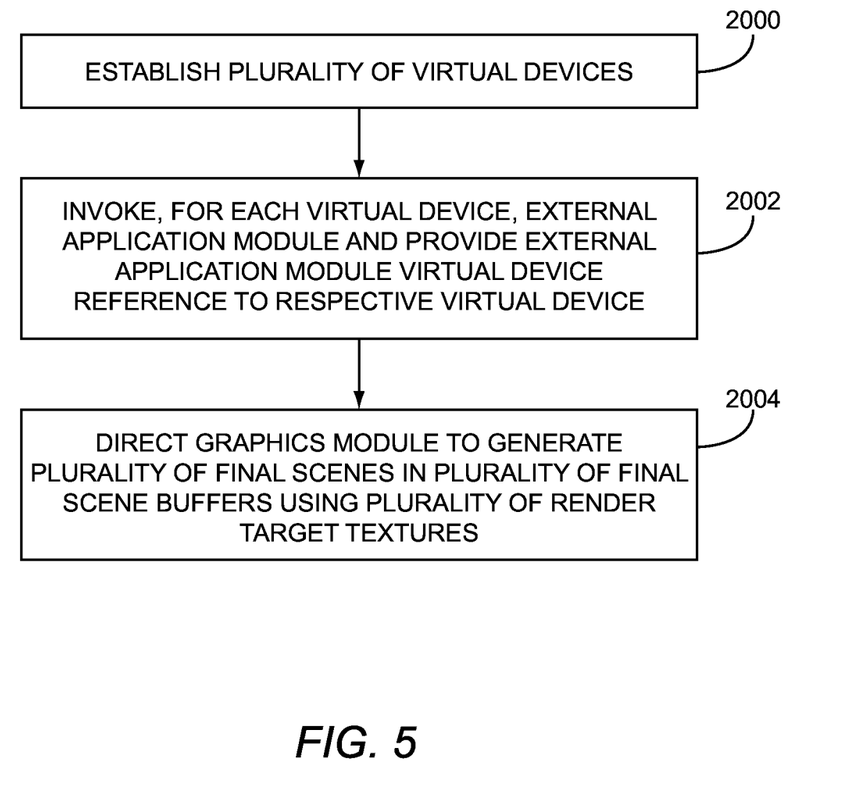
FIG. 5 is a flowchart of a process for sharing textures according to another embodiment, wherein the external application module may be invoked multiple times to provide imagery for different final scenes.

FIG. 5 is a flowchart of a process for sharing textures according to another embodiment, wherein the external application module 22 may be invoked multiple times to provide imagery for different final scenes. FIG. 5 will be discussed in conjunction with FIG. 4. As discussed above with regard to FIG. 1, assume for purposes of illustration and discussion with regard to FIGS. 4 and 5, that in the course of a simulation the primary application 20 generates a cockpit of an airplane, and that the entity associated with the external application module 22 desires to integrate into such imagery a particular gauge so that the user 30 may perceive a cockpit having a gauge that would be substantially similar to the gauge in the airplane the user 30 may fly at some point in the future. The final scene displayed on the display device 32-1 may contain one depiction of the gauge and the final scene displayed on the display device 32-2 may contain another depiction of the gauge, perhaps from a different perspective than that depicted on the display device 32-1.

Initially, the primary application 20 may establish the virtual devices 38-1, 38-2 for use in interfacing with the graphics module 16 (FIG. 5, block 2000). The primary application 20 maintains a separate VD reference (not illustrated) which points, links, or otherwise refers to each respective virtual devices 38-1, 38-2. After the virtual devices 38-1, 38-2 are established, the primary application 20 may establish primary textures 40-1, 40-2 in the graphics memory 36. The primary texture 40-1 may be referenced by a primary texture reference 42-1 that is maintained in the virtual device 38-1, and primary texture 40-2 may be referenced by a primary texture reference 42-2 that is maintained in the virtual device 38-2. As discussed previously, by way of non-limiting example, assume that the primary application 20 directs the graphics module 16 to generate imagery associated with the cockpit of an airplane in the primary textures 40-1, 40-2.

When the virtual device 38-1 is used to interface with the graphics module 16, the graphics module 16 may perform graphics operations in accordance with one or more render states 44-1. When the virtual device 38-2 is used to interface with the graphics module 16, the graphics module 16 may perform graphics operations in accordance with one or more render states 44-2.

The primary application 20 may generate the cockpit imagery in the primary textures 40-1, 40-2. The primary application 20 may access the configuration data 45 and determine that the external application module 22 is to be invoked. Prior to invoking the external application module 22, the primary application 20 may first save the render state values of the render states 44-1 in association with the render states 44-1, and the render state values of the render states 44-2 in association with the render states 44-2 in the primary memory 18.

The primary application 20 may also set the plurality of render states 44-1 and 44-2 to default render state values. The primary application 20 may also generate the render target textures 46-1, 46-2 in the graphics memory 36 for use by the external application module 22.

The primary application 20 may then make a copy of the VD reference 50-1 that refers to the virtual device 38-1, and set the copy of the VD reference 50-1 to a valid state. The primary application 20 may then invoke the external application module 22 and provide the external application module 22 the copy of the VD reference 50-1 (FIG. 5, block 2002). The external application module 22 then causes or directs the graphics module 16 to generate imagery, such as the gauge, in the render target texture 46-1. The external application module 22 then returns to the primary application 20. The primary application 20 may then invalidate the copy of the VD reference 50-1 to ensure that the external application module 22 does not use the virtual device 38-1 while the primary application 20 is using the virtual device 38-1. The primary application 20 may also restore the plurality of render states 44-1 to the render state values that were previously stored in association with the render states 44-1 prior to invoking the external application module 22.

The primary application 20 may then repeat this process for the virtual device 38-2. Accordingly, the primary application 20 makes a copy of the VD reference 50-2 that refers to the virtual device 38-2, and sets the copy of the VD reference 50-2 to a valid state. The primary application 20 invokes the external application module 22 and provides the external application module 22 the copy of the VD reference 50-2. The external application module 22 then causes or directs the graphics module 16 to generate imagery, such as the gauge, in the render target texture 46-2. The external application module 22 then returns to the primary application 20. The primary application 20 may then invalidate the copy of the VD reference 50-2, and restores the plurality of render states 44-2 to the render state values that were previously stored in association with the render states 44-2 prior to invoking the external application module 22. While only two virtual devices 38 are illustrated, it will be apparent that this process may be repeated for any number of virtual devices 38.

The primary application 20 may then direct the graphics module 16 to generate a final scene in the final scene buffer 52-1 using the render target texture 46-1 and the primary texture 40-1, and to generate a final scene in the final scene buffer 52-2 using the render target texture 46-2 and the primary texture 40-2. In response to such directions, the graphics module 16 may generate the final scene in the final scene buffer 52-1 and display the final scene to the user 30 via the display device 32-1, and generate the final scene in the final scene buffer 52-2 and display the final scene to the user 30 via the display device 32-2 (FIG. 5, block 2004).

Figure 6:
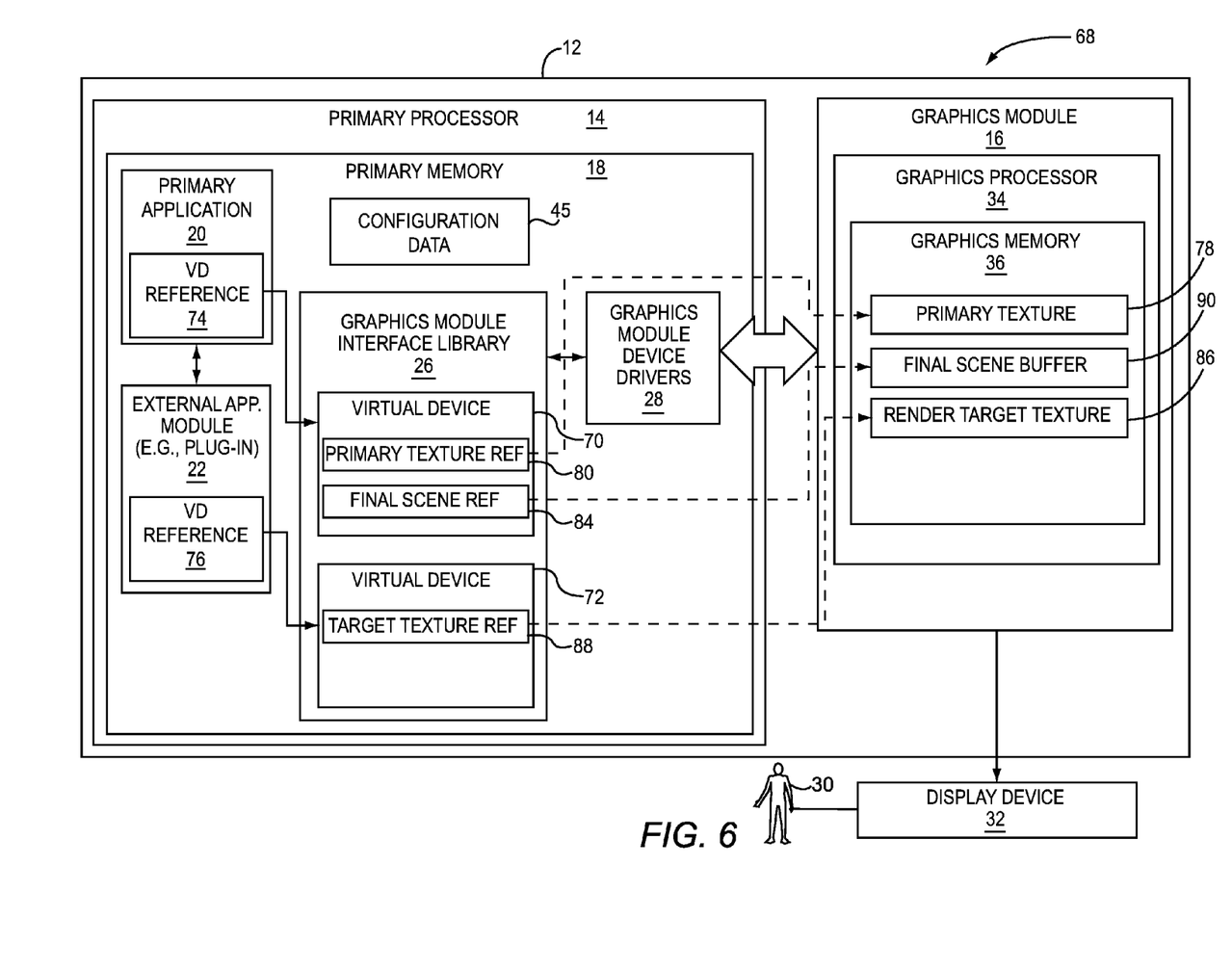
FIG. 6 is a block diagram of a simulation system according to another embodiment.

FIG. 6 is a block diagram of a simulation system 68 according to another embodiment. In this embodiment, the external application module 22 establishes a virtual device 70 for interaction with the graphics module 16, and the external application module 22 establishes its own virtual device 72 for interaction with the graphics module 16. A VD reference 74 refers to the virtual device 70, and a VD reference 76 refers to the virtual device 72. The primary application 20 establishes a primary texture 78 in the graphics memory 36, which is referenced by a primary texture reference 80 in the virtual device 70. The primary application 20 also establishes a final scene buffer 82 in the graphics memory 36, which is referenced by a final scene reference 84 in the virtual device 70.

As discussed above, by way of non-limiting example, assume that the primary application 20 directs the graphics module 16 to generate imagery associated with the cockpit of an airplane in the primary texture 78. Once the cockpit imagery is generated in the primary texture 78, the primary application 20 may determine that the external application module 22 is to be invoked in order to facilitate the generation of the gauge imagery. The primary application 20 may make this determination by accessing the configuration data 45, which may identify that the external application module 22 is to be invoked. The configuration data 45 may include, by way of non-limiting example, a name of an executable file in which the external application module 22 is stored. The primary application 20 may then invoke the external application module 22. In this embodiment, the primary application 20 need not provide the external application module 22 a VD reference to the virtual device 70, because the external application module 22 has established its own virtual device 72. Using the virtual device 72, the external application module 22 establishes a render target texture 86 in the graphics memory 36, which may be referenced by a target texture reference 88. The external application module 22 uses the virtual device 72 to cause or direct the graphics module 16 to generate imagery, such as a gauge, in the render target texture 86. After the external application module 22 completes the desired processing to cause the generation of the gauge imagery in the render target texture 86, the external application module 22 returns to the primary application 20. The primary application 20 may then direct the graphics module 16 to generate a final scene in a final scene buffer 90 using the render target texture 86, and the primary texture 78. In response to such directions, the graphics module 16 may generate the final scene in the final scene buffer 90 based on the render target texture 86 and the primary texture 78, and display the final scene to the user 30 via the display device 32. This process may occur repeatedly over a period of time during the simulation.

Figure 7:
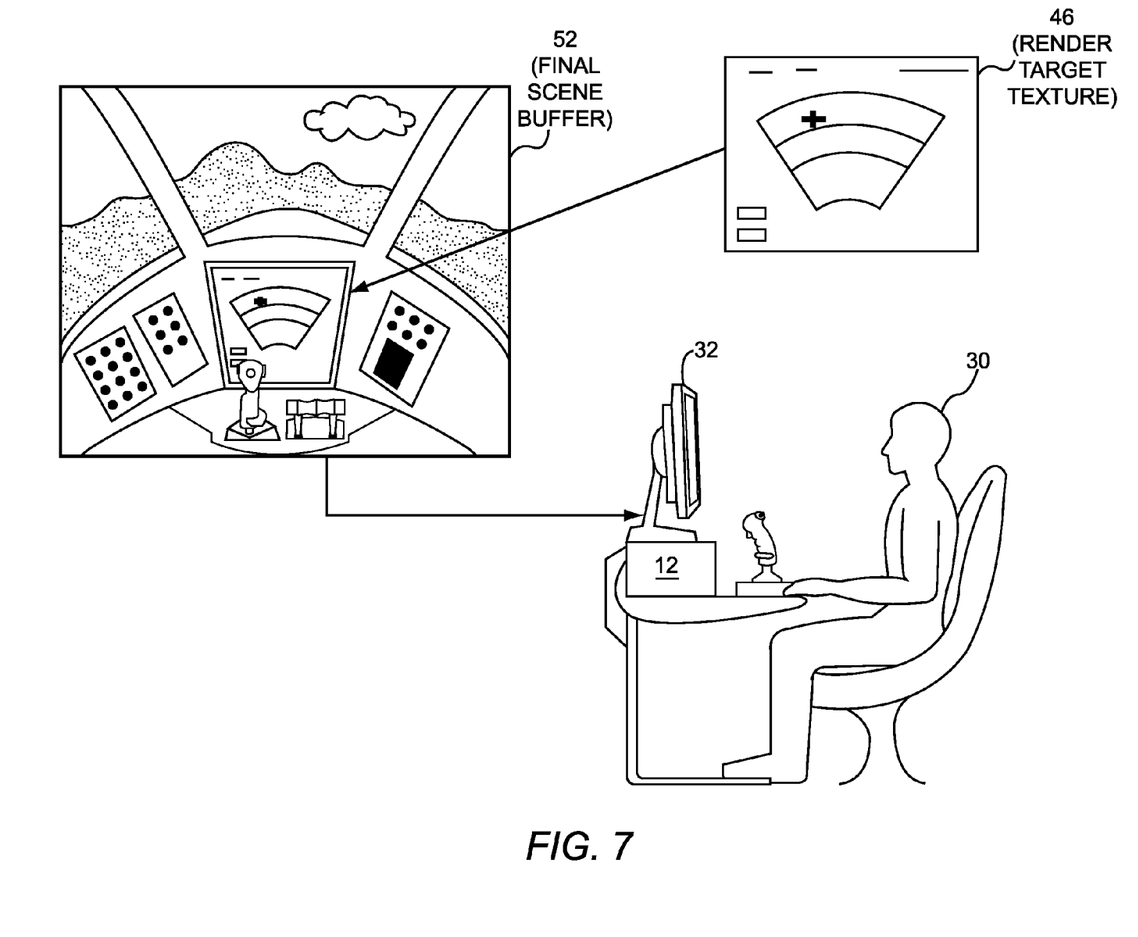
FIG. 7 is an illustration correlating textures with imagery that may be perceived by a user according one embodiment.

FIG. 7 is an illustration correlating textures with imagery that may be perceived by a user according one embodiment, and will be discussed in conjunction with FIG. 1. FIG. 7 illustrates a single frame which may be presented on the display device 32 to the user 30. The contents of the final scene buffer 52 include the contents of the render target texture 46. In particular, the gauge imagery rendered in the render target texture 46 may be integrated into the final scene buffer 52, and thus the user 30 may perceive a gauge that is substantially similar to that which the user 30 may perceive when flying an actual aircraft.

Figure 8:
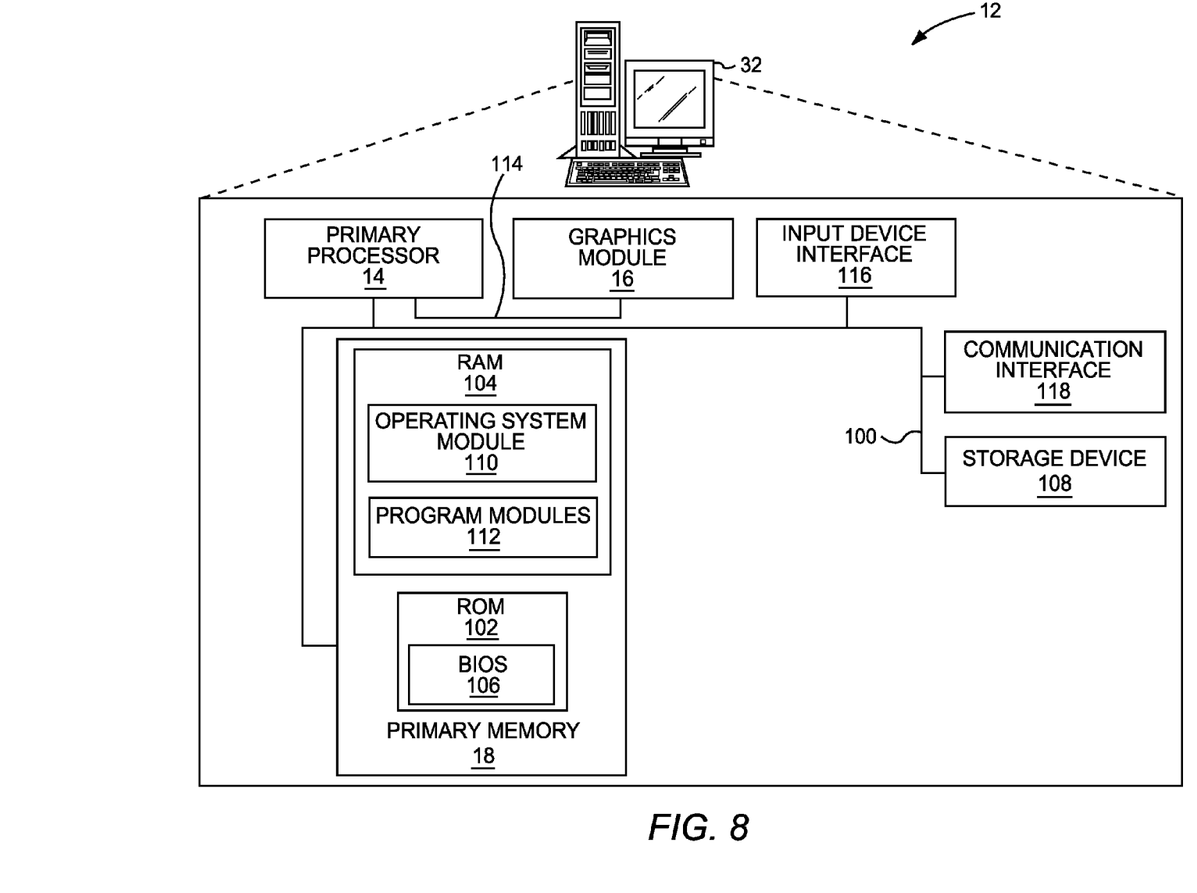
FIG. 8 is a block diagram of a simulation device according to one embodiment.

FIG. 8 is a block diagram of a simulation device 12 according to one embodiment. The simulation device 12 may comprise any computing or processing device capable of executing software instructions to implement the functionality described herein, such as a work station, a desktop or laptop computer, a tablet computer, or the like. The simulation device 12 may include a primary processor 14, the primary memory 18, and a system bus 100. The system bus 100 may provide an interface for system components including, but not limited to, the primary memory 18 and the primary processor 14. The primary processor 14 can be any commercially available or proprietary processor. Dual microprocessors and other multi-processor architectures may also be employed as the primary processor 14.

The system bus 100 may be any of several types of bus structures that may further interconnect to a memory bus (with or without a memory controller), a peripheral bus, and/or a local bus using any of a variety of commercially available bus architectures. The primary memory 18 may include non-volatile memory 102 (e.g., read only memory (ROM), erasable programmable read only memory (EPROM), electrically erasable programmable read only memory (EEPROM), etc.) and/or volatile memory 104 (e.g., random access memory (RAM)). A basic input/output system (BIOS) 106 may be stored in the non-volatile memory 102, and may include the basic routines that help to transfer information between elements within the simulation device 12. The volatile memory 104 may also include a high-speed RAM, such as static RAM, for caching data.

The simulation device 12 may further include a computer-readable storage device 108, which may comprise, by way of non-limiting example, an internal hard disk drive (HDD), a flash memory, or the like. The computer-readable storage device 108 and other drives, sometimes referred to as computer-readable or computer-usable media, provide non-volatile storage of data, data structures, computer-executable instructions, and the like, and may store, by way of non-limiting example, the configuration data 45 and the instructions that implement the functionality of the primary application 20 and the external application module 22. Although for purposes of illustration the description of the computer-readable storage device 108 above refers to a HDD, it should be appreciated by those skilled in the art that other types of media which are readable by a computer, such as Zip disks, magnetic cassettes, flash memory cards, cartridges, and the like, may also be used in the operating environment, and further, that any such media may contain computer-executable instructions for performing novel functionality as disclosed herein.

A number of modules can be stored in the computer-readable storage device 108 and in the volatile memory 104, including an operating system module 110 and one or more program modules 112, which may implement the functionality described herein in whole or in part, including, by way of non-limiting example, functionality associated with the primary application 20 and the external application module 22. It is to be appreciated that the embodiments can be implemented with various commercially available operating system modules 110 or combinations of operating system modules 110.

All or a portion of the embodiments may be implemented as a computer program product stored on a non-transitory computer-usable or computer-readable storage medium, such as the computer-readable storage device 108, which includes complex programming instructions, such as complex computer-readable program code, configured to cause the primary processor 14 to carry out the functionality described herein. Thus, the computer-readable program code can comprise software instructions for implementing the functionality of the embodiments described herein when executed on the primary processor 14. The primary processor 14, in conjunction with the program modules 112 in the volatile memory 104, may serve as a control system for the simulation device 12 that is configured to, or adapted to, implement the functionality described herein.

The simulation device 12 may also include the graphics module 16, which may be coupled to the primary processor 14 via a high-speed video bus 114, such as an AGP or PCI-E video bus. The graphics module 16 may drive the display device 32.

A user may be able to enter commands and information into the simulation device 12 through one or more input devices, such as, by way of non-limiting example, a keyboard (not illustrated), a pointing device such as a mouse (not illustrated), a touch-sensitive surface (not illustrated), or the like. Other input devices may include a microphone, an infrared (IR) remote control, a joystick, a game pad, a stylus pen, or the like. These and other input devices may be connected to the primary processor 14 through an input device interface 116 that may be coupled to the system bus 100, but can be connected by other interfaces such as a parallel port, an Institute of Electrical and Electronic Engineers (IEEE) 1394 serial port, a Universal Serial Bus (USB) port, an IR interface, and the like.

The simulation device 12 may also include a communication interface 118 suitable for communicating with a wired or wireless network.

Those skilled in the art will recognize improvements and modifications to the embodiments. All such improvements and modifications are considered within the scope of the concepts disclosed herein and the claims that follow.

What is claimed is:

1. A method, comprising:
   establishing, by a primary application executing on a primary processor that controls a primary memory, a virtual device for interaction with a graphics module, the graphics module comprising a graphics processor that controls a graphics memory, the virtual device comprising a texture reference that refers to a render target texture in the graphics memory of the graphics module and a primary texture reference that refers to a primary texture in the graphics memory, and a plurality of render states, the plurality of render states having corresponding render state values;
   causing, by the primary application, the generation of imagery in the primary texture in the graphics memory;
   saving, by the primary application, the plurality of render state values in a memory in association with the corresponding render states;
   invoking, by the primary application in the primary memory, an external application module and providing the external application module a virtual device reference to the virtual device;
   upon a return of the external application module, restoring the plurality of render states to the corresponding render state values; and
   directing, by the primary application, the graphics module to generate a final scene in a final scene buffer in the graphics memory of the graphics module using the render target texture and the primary texture, such that the final scene comprises imagery from the render target texture and the imagery from the primary texture.

2. The method of claim 1, further comprising setting, by the primary application, the plurality of render states to corresponding default render state values prior to invoking the external application module.

3. The method of claim 1, further comprising determining, by the primary application, during execution of the primary application, that the external application module is to be invoked by the primary application.

4. The method of claim 3, wherein determining that the external application module is to be invoked comprises accessing configuration data that identifies that the external application module is to be invoked.

5. The method of claim 1, wherein the external application module uses the virtual device to cause imagery to be stored in the render target texture.

6. The method of claim 1, wherein the virtual device reference has a valid state and an invalid state, further comprising upon the return of the external application module, setting the virtual device reference to the invalid state.

7. The method of claim 1, wherein the external application module causes imagery to be stored in the render target texture, the imagery comprising a portion of the final scene that is displayed to a user.

8. The method of claim 1, further comprising:
establishing a plurality of virtual devices including the virtual device, each virtual device corresponding to a different display device of a plurality of display devices, and each virtual device comprising a corresponding texture reference that refers to a different render target texture of a plurality of render target textures in the graphics module;
invoking, by the primary application for each virtual device, the external application module and providing the external application module the virtual device reference to the each virtual device; and
directing the graphics module to generate a plurality of final scenes in a plurality of final scene buffers in the graphics memory of the graphics module using the plurality of render target textures.

9. A device, comprising:
a graphics module comprising a graphics processor and a graphics memory;
a primary memory; and
a primary processor coupled to the graphics module and configured to:
establish, by a primary application executing in the primary memory, a virtual device for interaction with the graphics module, the virtual device comprising a texture reference that refers to a render target texture in the graphics memory of the graphics module and a primary texture reference that refers to a primary texture in the graphics memory, and a plurality of render states, the plurality of render states having corresponding render state values;
cause, by the primary application, the generation of imagery in the primary texture in the graphics memory;
save, by the primary application, the plurality of render state values in a memory in association with the corresponding render states;
invoke, by the primary application in the primary memory, an external application module and provide the external application module a virtual device reference to the virtual device;
upon a return of the external application module, restore the plurality of render states to the corresponding render state values; and
direct, by the primary application, the graphics module to generate a final scene in a final scene buffer in the graphics memory of the graphics module using the render target texture and the primary texture, such that the final scene comprises imagery from the render target texture and the imagery from the primary texture.

10. The device of claim 9, wherein the primary processor is further configured to set, by the primary application, the plurality of render states to a corresponding default render state values prior to invoking the external application module.

11. The device of claim 9, wherein the primary processor is further configured to determine, by the primary application, during execution of the primary application, that the external application module is to be invoked by the primary application.

12. The device of claim 11, wherein to determine that the external application module is to be invoked, the primary processor is further configured to access, by the primary application, configuration data that identifies that the external application module is to be invoked.

13. The device of claim 9, wherein the virtual device reference has a valid state and an invalid state, and wherein the primary processor is further configured to set the virtual device reference to the invalid state upon the return of the external application module.

14. A computer program product, the computer program product stored on a non-transitory computer-readable storage medium and including instructions configured to cause a processor to carry out the steps of:
establishing, by a primary application executing on a primary process that controls a primary memory, a virtual device for interaction with a graphics module, the graphics module comprising a graphics processor that controls a graphics memory, the virtual device comprising a texture reference that refers to a render target texture in the graphics memory of the graphics module and a primary texture reference that refers to a primary texture in the graphics memory, and a plurality of render states, the plurality of render states having corresponding render state values;
causing, by the primary application, the generation of imagery in the primary texture in the graphics memory;
saving, by the primary application, the plurality of render state values in a memory in association with the corresponding render states;
invoking, by the primary application in the primary memory, an external application module and providing the external application module a virtual device reference to the virtual device;
upon a return of the external application module, restoring the plurality of render states to the corresponding render state values; and
directing, by the primary application, the graphics module to generate a final scene in a final scene buffer in the graphics memory of the graphics module using the render target texture and the primary texture, such that the final scene comprises imagery from the render target texture and the imagery from the primary texture.

15. The computer program product of claim 14, wherein the instructions are further configured to cause the processor to set, by the primary application, the plurality of render states to corresponding default render state values prior to invoking the external application module.

* * * * *